UNITED STATES PATENT OFFICE.

ADONIRAM J. CUSHMAN, OF MONSON, MAINE, ASSIGNOR OF FIVE-SIXTHS TO CHARLES S. PULLEN, WALTER H. BLAKE, AMASA S. GARLAND, ALVIN GRAY, AND HORACE C. PULLEN, ALL OF SAME PLACE.

COMPOSITION BATH FOR TREATING SLATE OR OTHER POROUS STONE.

SPECIFICATION forming part of Letters Patent No. 367,372, dated August 2, 1887.

Application filed April 12, 1887. Serial No. 234,477. (No specimens.)

*To all whom it may concern:*

Be it known that I, ADONIRAM J. CUSHMAN, a citizen of the United States, residing at Monson, in the county of Piscataquis, and State of Maine, have invented a new and useful Composition Bath for Treating Slate or other Porous Stone; and I do hereby declare that the following is a full, clear, and exact description of the invention, which will enable others skilled in the art to which it appertains to make and use the same.

My invention relates to an improved composition bath for treating slate or other porous stone, and has especial application in the preparation of the slate linings used in refrigerators, butter, berry, and fruit boxes, &c.

In its natural state and without special preparation, slate, when used for any of the foregoing purposes, both communicates an earthy flavor to the contents of the refrigerator or box and absorbs into its pores the odors and exudations from its contents, and then in turn giving out the odors from the exudations it has absorbed is liable to taint the substances subsequently received within the refrigerator or box.

The object of my invention is to provide a means of filling the pores of the stone or slate linings of such boxes or refrigerators, and thus, by preventing all absorption by the stone and destroying its natural odor, insure a perfectly sweet and inodorous lining.

I accomplish my object by providing the following-described composition bath for treating the stone.

To forty (40) gallons pure soft water I add one (1) bushel of common salt, one-half (½) bushel of finely-pulverized charcoal, two (2) pounds sal-soda, and two (2) pounds of saltpeter. To this composition may be added, when desired, four (4) pounds of water-slaked lime. The slaked lime is not absolutely essential, but for some purposes has certain advantages. The foregoing proportions of the various ingredients are not absolutely invariable, but should be essentially observed.

The slate or stone is treated with my composition bath in the following manner: It is first carefully washed in clean water and then immersed in my composition, where it should remain for about twenty-four (24) hours. By this treatment I find that the earthy odor of the stone is completely destroyed, that its pores are completely filled, and that it has become incapable of absorbing odors from the substances placed in contact with it. Food substances placed in a receptacle lined with slate or other stone thus treated may be kept entirely sweet and untainted.

A further and incidental advantage in the use of my composition may be found in the fact that slate treated with it and polished assumes a very rich and beautiful dark color.

Having thus described my invention, what I claim, and desire to secure by Letters Patent, is—

1. The composition bath for treating slate or other porous stone, consisting of water, salt, charcoal, sal-soda, and saltpeter, in about the proportions specified, and substantially as described.

2. The composition bath for treating slate or other porous stone, consisting of water, salt, charcoal, sal-soda, saltpeter, and water-slaked lime, in about the proportions specified, and substantially as described.

ADONIRAM J. CUSHMAN.

Witnesses:
P. W. KNIGHT,
W. H. BLAKE.